(12) United States Patent
Kurita

(10) Patent No.: US 7,886,970 B2
(45) Date of Patent: Feb. 15, 2011

(54) DATA COMMUNICATING APPARATUS AND METHOD FOR MANAGING MEMORY OF DATA COMMUNICATING APPARATUS

(75) Inventor: Taro Kurita, Tokyo (JP)

(73) Assignee: Sony Corporation, Tokyo (JP)

( * ) Notice: Subject to any disclaimer, the term of this patent is extended or adjusted under 35 U.S.C. 154(b) by 1083 days.

(21) Appl. No.: 10/585,106

(22) PCT Filed: Dec. 21, 2004

(86) PCT No.: PCT/JP2004/019119

§ 371 (c)(1),
(2), (4) Date: Dec. 28, 2006

(87) PCT Pub. No.: WO2005/066802

PCT Pub. Date: Jul. 21, 2005

(65) Prior Publication Data

US 2007/0152068 A1    Jul. 5, 2007

(30) Foreign Application Priority Data

Jan. 6, 2004    (JP) .............................. 2004-001359

(51) Int. Cl.
*G06K 5/00* (2006.01)
(52) U.S. Cl. ...................... 235/382; 235/492
(58) Field of Classification Search ............ 235/382, 235/492
See application file for complete search history.

(56) References Cited

U.S. PATENT DOCUMENTS 6,619,554 B1    9/2003    Vestergaard et al.

| | | |
|---|---|---|
| 2002/0029343 A1 | 3/2002 | Kurita |
| 2003/0174839 A1 | 9/2003 | Yamagata et al. |
| 2004/0194153 A1 | 9/2004 | Garg et al. |

FOREIGN PATENT DOCUMENTS

| JP | 62-49595 | 3/1987 |
| JP | 63-108445 | 5/1988 |
| JP | 1-217587 | 8/1989 |
| JP | 5-266272 | 10/1993 |
| JP | 11-306301 | 11/1999 |
| JP | 2001-22642 | 1/2001 |
| JP | 2002-157554 | 5/2002 |

*Primary Examiner*—Michael G Lee
*Assistant Examiner*—Kristy A Haupt
(74) *Attorney, Agent, or Firm*—Oblon, Spivak, McClelland, Maier & Neustadt, L.L.P.

(57) ABSTRACT

An IC card has a mechanism to securely manage information for each of a plurality of service providers in a memory area of the IC card. The IC card is shared by the plurality of service providers. File systems of the service providers are allocated in the memory area, and a single information recording medium is shared by the plurality of service providers. The memory area is separated into the file systems. A border between the file systems functions as a firewall, thus appropriately preventing one of the file systems from being intruded by the other file systems. Furthermore, by using a function of separating the memory area into a plurality of file systems together with a security code verification function of each file system, the security of each file system is independently managed.

17 Claims, 12 Drawing Sheets

SECURITY CODE SERVICE DATA BLOCK

DATA COMMUNICATING APPARATUS AND METHOD FOR MANAGING MEMORY OF DATA COMMUNICATING APPARATUS

TECHNICAL FIELD

The present invention relates to a data communication apparatus including a relatively high-capacity memory and a method for managing the memory of the data communication apparatus and, in particular, to a data communication apparatus for storing electronic value information in a memory area and communicating secure information including electronic payment information and a method for managing the memory of the data communication apparatus.

More specifically, the present invention relates to a data communication apparatus and a method for managing the memory of the data communication apparatus for allocating a file system for a service provider in a single memory area and allowing a plurality of service providers to share the data communication apparatus to provide a plurality of services with the data communication apparatus. In particular, the present invention relates to a data communication apparatus and a method for managing the memory of the data communication apparatus for managing a session between the data communication apparatus and an external apparatus for each of a plurality of file systems and analyzing, managing, and dealing with a threat to security independently for each file system.

BACKGROUND ART

Examples of wireless communication means that is applicable only in a local area include a contactless IC card.

In general, this type of wireless communication is realized on the basis of the principal of electromagnetic induction. That is, the wireless communication is performed by an IC card having a memory function and a card reader/writer for accessing a memory of the IC card to read information from and write information to the memory. A loop coil of the IC card serves as a primary coil and an antenna of the card reader/writer serves as a secondary coil so as to form a transformer as a system. The card reader/writer transmits electric power and information to the IC card using electromagnetic induction. The IC card can operate using the supplied electric power so as to respond to an inquiry signal from the card reader/writer.

When the card reader/writer modulates an electric current passing through the antenna, the induced voltage of the loop coil of the IC card is modulated. Using this effect, the card reader/writer can transmit data to the IC card. Additionally, as the load between terminals of the loop coil of the IC card varies, the impedance between antenna terminals of the IC card reader/writer varies, and therefore, the passing electric current or the voltage of the antenna varies. Using this effect, the IC card can transmit a response to the card reader/writer.

Contactless short-range communication systems including IC cards have been in widespread use due to their simplicity of operation. For example, a security code, other personal identification information, and electronic value information (e.g., an electronic ticket) can be stored on an IC card. The card reader/writers are disposed in cash dispensers, at the entrances/exits of concert halls, and at ticket gates of railway stations. When a user places an IC card above the card reader/writer, the IC card can contactlessly access the card reader/writer. Thus, the authentication process can be performed.

Recently, with the improvement in fine processing technology, an IC card having a relatively high-capacity memory space has been realized. Since the IC card having a high-capacity memory can store a plurality of applications at the same time, the IC card can be used for a plurality of purposes. For example, one IC card that stores a plurality of applications (e.g., electronic money and an electronic ticket for a specific concert hall) can be used for a variety of purposes. Here, the terms "electronic money" and "electronic ticket" refer to a payment (electronic payment) system using electronic data issued to a user in accordance with a fund provided by the user or such electronic data itself.

In general, the IC card is used by a user placing the IC card above the card reader/writer. The card reader/writer poles an IC card at all times. When the card reader/writer finds an external IC card, the communication between the IC card and the card reader/writer starts.

At that time, the user inputs the security code to the card reader/writer. The card reader/writer compares the input security code with the security code stored in the IC card. Thus, the personal identity verification or authentication process is performed between the IC card and the card reader/writer. (This security code used during accessing the IC card is referred to as a "personal identification number (PIN)".) If the personal identity verification or authentication process is successful, the user can use an application stored in the IC card, for example. That is, the user can access a service memory area allocated to the application (hereinafter referred to as a "service memory area"). When accessing the service memory area, appropriate encrypted communication is performed depending on the security level of the application.

Furthermore, if the IC card and the card reader/writer (card reader/writer apparatus) include a wired interface (not shown) for communicating with an external apparatus in addition to the wireless contactless interface, the function of either one of the IC card and the card reader/writer or both can be provided to an apparatus, such as a cell phone, a personal digital assistant (PDA) and a personal computer. In such a case, the IC card technology can be applied to a general bi-directional short range communication interface.

For example, when short-range communication is performed among computers and home information appliances, one-to-one communication using an IC card is performed therebetween. In addition, some apparatuses can communicate with an apparatus other than a contactless IC card. In such a case, an application can be provided in which one-to-many communication is performed between one apparatus and a plurality of cards.

Additionally, a variety of applications that use an IC card in order to externally communicate electronic value information (such as electronic payment) can be run on an information processing apparatus. For example, by using a keyboard and a display on the information processing apparatus, a user can communicate with the IC card. Since the IC card is connected to a cell phone, a user can send information stored in the IC card via a telephone line. Furthermore, using the IC card, the user can send payment from the cell phone via the Internet.

Thus, if a file system for a service provider is allocated in an internal memory of the IC card and service information used for the service provider (e.g., user identification/authentication information, information about the remaining value, or the use history (log)) is managed in the file system, a useful service based on contactless short-range communication that is the replacement for a known prepaid card and a service card provided by each store can be achieved.

Conventionally, each service provider issues an IC card to a user to provide the service thereof. Accordingly, the user has a plurality of cards, each used for one service, and caries the cards with them. In contrast, according to an IC card that has a relatively high-capacity memory space, the IC card can provide sufficient memory space for storing information about a plurality of services in the internal memory.

For advance-payment-type cards, such as prepaid cards, to ensure proper business conduct for issuing the cards, protect the purchasers of the cards, and ensure the credibility of the cards, "A law regarding the regulation of the advance-payment-type cards and the like" (known as the "purika" law) has been established so that the issuers of advance-payment-type cards must register with the authorities and are regulated by the law. Also, according to the law, for providing a convenient service to users and maintaining marketing order, predetermined items, such as a logo and the contact address must be printed oh a prepaid card (on a surface of the card) (see section 12 of the law).

When providing a prepaid card that stores prepaid information in the memory thereof, the number of providing services is limited to one due to the printing of information on a medium regulated by the law. In contrast, when an IC card function is used on a mobile device (e.g., a cell phone) having a display function, the requirement of the regulation of the law can be satisfied by displaying information related to the desired value information (refer to, for example, Patent Document 1). Thus, a plurality of service providers can share the IC card function. Accordingly, for the service providers, the workload to issue a card is reduced whereas, for the users, the number of IC cards that the user should carry with them is reduced.

Unfortunately, when a plurality of service providers share a single memory area and each service provider is allowed to freely access a memory area of a different service provider which shares the memory, the value information set for each service provider may be used by the different unauthorized service provider. As a result, the service provider cannot provide a reliable service. Also, the user has the risk of leakage of the value information with high liquidity, thus suffering economic loss.

Therefore, in the case where a plurality of service providers share an IC card, it is required that the user can consider the IC card to be a card that each service provider originally issues when the user uses the service. In addition, the IC card is required to have a feature to securely manage the information for each service provider in the memory area.

[Patent Document 1]
Japanese Unexamined Patent Application Publication No. 2003-141434

DISCLOSURE OF INVENTION

Problems to be Solved by the Invention

The present invention provides an excellent data communication apparatus and method for managing a memory of the data communication apparatus that can store electronic value information in the memory area and securely exchange the information for, for example, electronic payment.

The present invention further provides an excellent data communication apparatus and method for managing a memory of the data communication apparatus that can provide a user with ease of use as if an IC card were directly issued by a service provider of the service that the user is currently using and that has a mechanism to securely manage information about a plurality of service providers in a memory area so that the plurality of service providers can share one IC card.

The present invention further provides an excellent data communication apparatus and a method for managing a memory of the data communication apparatus in which File systems of the service providers are allocated in the memory area and, when the plurality of service providers shares the data communication apparatus, a session between the file system and an external apparatus is managed for each file system. Thus, a threat to security is independently analyzed, managed, and dealt with for each file system.

Means for Solving the Problems

According to the present invention, a data communication apparatus having a memory space and managing the memory space by separating the memory space into one or more file systems includes authenticating means for requesting performance of one of a mutual authentication and a verification for a security code for each file system to be accessed from an external apparatus or a program, authentication information managing means for managing, for each file system, whether the file system is in an authentication-required state in which performance of one of the mutual authentication and the verification for the security code is requested or in a release state in which the access is permitted after the one of the mutual authentication and the verification for the security code is completed, and state managing means for returning the file system from the release state to the authentication-required state in response to an occurrence of a predetermined event. As used herein, the term "data communication apparatus" refers to a contactless IC card including a wireless communications unit and an IC chip having a data reception/transmission function and a data processing unit, a contact IC card having a terminal on the surface thereof, or an information communications apparatus (e.g., a cell phone, a personal handyphone system (PHS), or a personal digital assistance (PDA)) including an IC chip having the same function as that of a contact/contactless IC card. This data communication apparatus has a memory area including a data accumulating memory (e.g., an EEPROM) and a data processing unit. This data communication apparatus further has a data communications function. In the case of, for example, a cell phone, an external storage medium, such as an IC card incorporating an IC chip, may be removably mounted to the cell phone. Additionally, the IC chip may include a subscriber identity module (SIM) function for storing the subscriber information provided by a cell phone carrier. The data communication apparatus can carry out data communication via an information communication network, such as the Internet, or can directly communicate data with an external apparatus either wired or wirelessly.

The present invention provides a service that ensures security of, for example, the exchange of value information using the tamper resistant and authenticating function of an IC card. More particularly, the present invention reduces the card issuing load of service providers by allowing the plurality of services to share a single memory space inside the IC card. Also, the present invention reduces the number of cards that a user carries and manages.

When a plurality of service providers share a single memory area and some service provider is allowed to access a memory space for a different provider, value information set by each service provider may be accessed by other unauthorized service providers.

In contrast, according to the present invention, file systems for a plurality of service providers are allocated in a single memory space, and one data communication apparatus can be shared by the service providers so as to provide a plurality of services. By separating the memory area into a plurality of file systems, the border between the file systems functions as a firewall, thus appropriately preventing one of the file systems (i.e., one of the service providers) from being accessed (intruded) by the other file systems.

Initially, the entire memory area in an IC card is managed by an original card issuer of the IC card. When a service provider other than the original IC card issuer separates the memory area to generate a new file system, the service provider is required for the privilege of separating the memory area and the authentication by the original IC card issuer.

By repeating such a separating operation, a plurality of file systems coexist in the memory area of the IC card. The separation of the file system is considered to be a virtual card issuing operation.

After the memory space is separated, in order to access the file system, the authentication by the service provider of the file system is required in place of the authentication by the original IC card issuer. That is, to access the file system, mutual authentication using the issuer key of the file system is required. Furthermore, by assigning a security code, namely, a PIN to each file system or a directory (or a file) in the file system in accordance with the security level, the PIN may be verified when starting a service.

For a system in which a memory area of an IC card is separated into a plurality of file systems for the service providers and is shared by the service providers, when access to a given file system is attempted and mutual authentication and PIN verification are carried out and when the system enters a release state and the session is established, the security of the other file systems becomes a concern. This is because, if the state of the session is maintained, the threat of the security of the other file systems being cracked arises during the session.

Therefore, according to the present invention, by using the function of separating the memory area into a plurality of file systems together with the security code verification function of the directory and file in each file system, the threat to the security of each file system can be independently analyzed, managed, and dealt with.

That is, when a plurality of logical file, systems are disposed in the memory area of the IC card and an external apparatus or a program changes the file system to be accessed, the system management information (including the mutual authentication information) and PIN release information held in each memory area are reset. Furthermore, by resetting the power supply of the IC card after a certain period of time has elapsed since the IC card was powered on (e.g., a period of time in which the used session encryption scheme cannot be decrypted on the basis of present-day cracking technology and the speed of present-day computers), similarly, system management information and PIN release information are reset.

Thus, by appropriately switching between the authentication-required state and release state, the system can eliminate the threat of cracking caused by continuously maintaining the session state.

Advantages

According to the present invention, an excellent data communication apparatus and method for managing a memory of the data communication apparatus can be provided that can store electronic value information in the memory area and securely exchange the information for, for example, electronic payment.

Additionally, according to the present invention, an excellent data communication apparatus and method for managing a memory of the data communication apparatus can be provided that can provide a user with the ease of use as if an IC card were directly issued by a service provider of the service that the user is currently using and that has a mechanism to securely manage information about a plurality of service providers in a memory area so that the plurality of service providers can share one IC card.

According to the present invention, an excellent data communication apparatus and a method for managing a memory of the data communication apparatus are further provided in which File systems of the service providers are allocated in the memory area and, when the plurality of service providers shares the data communication apparatus, a session between the file system and an external apparatus is managed for each file system. Thus, a threat to security is independently analyzed, managed, and dealt with for each file system.

According to the present invention, by using the function of separating the memory area into a plurality of file systems together with the security code verification function of the directory and file in each file system, the threat to the security of each file system can be independently analyzed, managed, and dealt with.

Further features and advantages of the present invention will become apparent from the following detailed description of exemplary embodiments with reference to the attached drawings.

Best Mode for Carrying Out the Invention

Embodiments of the present invention are now herein described in detail with reference to the accompanying drawings.

The present invention provides a service that ensures security of, for example, the exchange of value information using the tamper resistant and authenticating function of an IC card. More particularly, the present invention reduces the card issuing load of service providers by allowing a plurality of services to share a single memory space inside the IC card. Also, the present invention reduces the number of cards that a user carries and manages.

Here, when a plurality of service providers share a single memory area and some service provider is allowed to access a memory space for a different provider, value information set by each service provider may be accessed by other unauthorized service providers.

According to the present invention, file systems for a plurality of service providers are allocated in a single memory space, and one data communication apparatus can be shared by the service providers so as to provide a plurality of services. By separating the memory area into a plurality of file systems, the border between the file systems functions as a firewall, thus appropriately preventing one of the file systems (i.e., one of the service providers) from being accessed (intruded) by the other file systems.

Initially, the entire memory area in an IC card is managed by an original card issuer of the IC card. When a service provider other than the original IC card issuer separates the memory area to generate a new file system, the service provider is required for the privilege of separating the memory area and the authentication by the original IC card issuer.

After the memory space is separated, in order to access the file system, the authentication by the service provider of the file system is required in place of the authentication by the original IC card issuer. Therefore, when using each service, a user of the IC card can obtain ease of use as if the IC card were directly issued by the service provider of the service that the user is currently using.

Furthermore, by using the function of separating the memory area into a plurality of file systems together with the security code verification function of the directory and file in each file system, the threat to the security of each file system can be independently analyzed, managed, and dealt with.

The basic concepts of noncontact data communication between an IC card and a card reader/writer are described next with reference to FIGS. 1 and 2.

Wireless data communication between a card reader/writer and an IC card is realized on the basis of the principles of electromagnetic induction. FIG. 1 schematically illustrates the basic concepts of wireless data communication between a card reader/writer and an IC card. A card reader includes an antenna $L_{RW}$ composed of a loop coil. By applying an electric current $I_{RW}$ to the antenna $L_{RW}$, a magnetic field is generated around the antenna $L_{RW}$. On the other hand, a loop coil $L_c$ is electrically formed around the IC card. At terminals of the loop coil $L_c$ of the IC card, an induction voltage is caused by the magnetic field generated by the loop antenna $L_c$ of the card reader/writer. The induction voltage is input to the terminals of the IC card connected to the terminals of the loop coil $L_c$.

The coupling ratio between the antenna $L_{RW}$ of the card reader/writer and the loop coil $L_c$ of the IC card varies depending on the positional relationship therebetween. However, from a system perspective, the antenna $L_{RW}$ of the card reader/writer and the loop coil $L_c$ of the IC card form one-transformer. Accordingly, the read/write operation of the IC card can be modeled as shown in FIG. 2.

The card reader/writer modulates the electric current $I_{RW}$ applied to the antenna $L_{RW}$ so that a voltage $V_0$ induced in the loop coil $L_c$ of the IC chip is modulated. Using this phenomenon, the card reader/writer can transmit data to the IC card.

Additionally, the IC card has a function to change the load between the terminals of the loop coil $L_c$ in accordance with data to be returned to the card reader/writer (load switching). When the load between the terminals of the loop coil $L_c$ varies, the impedance between the terminals of the antenna of the card reader/writer varies. Thus, the variance in the electric current $I_{RW}$ passing through the antenna $L_{RW}$ or a voltage $V_{RW}$ of the antenna $L_{RW}$ is produced. By demodulating this variance, the card reader/writer can receive the data returned from the IC card.

That is, by varying the load of the antenna in accordance with the response signal to the inquiry signal from the card reader/writer, the IC card can modulate the amplitude of a signal appearing in a reception circuit of the card reader/writer. Thus, the IC card can communicate with the card reader/writer.

The IC card may be a card data communication apparatus or may be an information communication apparatus (e.g., a cell phone) incorporating an integrated circuit chip having an IC card function. For simplicity, as used herein, either one of the apparatus incorporating an IC card and the apparatus in which the IC card is removably mounted is also referred to as an "IC card". In addition, the integrated circuit chip having an IC card function is mounted in a mobile device (e.g., a cell phone or a PDA) and an information processing apparatus (e.g., a personal computer (PC)) in order to communicate data with an external apparatus. In such a case, the IC card includes an external peripheral interface in addition to the interface for communicating with the card reader/writer wired or wirelessly.

FIG. 3 illustrates the hardware configuration of a data communication apparatus according to the present invention. The data communication apparatus has an IC card function that allows the internal nonvolatile memory thereof to be accessed when a communication antenna is attached and a reader/writer function that supplies an external apparatus having an IC card function with electric power in order to achieve data exchange. The data communication apparatus incorporates an IC chip including a card function analog circuit 30, a data processing unit 40, and a card reader/writer function analog circuit 50. In an example shown in the drawing, the IC card has the card read/write function. However, this card read/write function is not an essential feature of the present invention.

In the card function analog circuit 30, carrier waves received by an antenna 32 are rectified by a rectifier 31 and are delivered to a signal processing unit 44 of the data processing unit 40 and a logic circuit 38 via a serial regulator 33.

The logic circuit 38 starts in response to a start signal input from a start-signal input terminal $P_{on}$. The logic circuit 38 controls the voltage from the serial regulator 33 and the voltage input from a power supply terminal VDD so as to supply a power supply voltage appropriate for the IC card.

The serial regulator 33 remains the output voltage constant regardless of the level of the input voltage. That is, if the input voltage is high, the serial regulator 33 increases the internal impedance so as to maintain the voltage constant. In contrast, if the input voltage is low, the serial regulator 33 decreases the internal impedance so as to maintain the voltage constant.

A voltage detector 39 monitors the input terminal voltage from a power-supply monitoring circuit connection terminal $V_{BT}$ connected to the logic circuit 38. If the voltage of an external power supply drops below a predetermined voltage, the voltage detector 39 outputs a signal for disabling the use of the external power supply to the logic circuit 38.

Additionally, in the card function analog circuit 30, a carrier-wave detector 34 determines whether radio waves input from the antenna 32 include carrier waves. If the radio waves input from the antenna 32 include the carrier waves, a carrier wave detection signal VR is output to the logic circuit 38. The logic circuit 38 can further output a signal indicating that the carrier waves are detected to the data processing unit 40.

A clock extractor 35 extracts a clock from the radio waves input from the antenna 32 and delivers this clock to a clock selector 36. A clock oscillator 37 is composed of, for example, a quartz resonator disposed outside the IC card. The clock oscillator 37 generates a clock of the driving frequency used for the IC card and delivers the clock to the clock selector 36. The clock selector 36 selects one of the clock delivered from the clock extractor 35 and the clock delivered from the clock oscillator 37 and delivers the selected clock to each component of the IC card.

The card reader/writer function analog circuit 50 includes a transmission amplifier 51, a reception signal detector 53, a reception amplifier filter 54, and transmission and reception antennas 52 and 55.

When transmitting data, the signal processing unit 44 of the data processing unit 40 modulates and D/A-converts the data to generate a transmission signal that is up-converted to an analog base-band. The transmission signal is output from the antenna 51 via the transmission amplifier. A signal received by the antenna 52 is detected by the reception signal detector 53 and is amplified by the reception amplifier 54. The signal is then delivered to the signal processing unit 44. The signal processing unit 44 down-converts the signal to the analog base-band signal. The signal processing unit 44 then D/A-converts and demodulates the signal to reproduce the digital data.

The card read/write operation between the IC card and the card reader/writer is the same as that described in relation to FIGS. 1 and 2.

The data processing unit 40 includes, in addition to the above-described signal processing unit 44, a central processing unit (CPU) 45, a data encryption engine 46 using, for example, the data encryption standard (DES), an error correction unit 47 using, for example, the cyclic redundancy check (CRC), a random access memory (RAM) 41, a read only memory (ROM) 42, an electrically erasable and programmable ROM (EEPROM) 43, a UART interface 48, and an I²C interface 49. All the above-described components are connected to each other via an internal bus.

The CPU 45 serves as a main controller that performs overall control of the operation of the IC card. The CPU 45 executes program code stored in, for example, the ROM 42 (or the EEPROM 43) in the execution environment (described below) provided by an operating system (OS) of the IC card. For example, the CPU 45 executes an application about data to be transmitted and data received via the card function analog circuit 30 and the card reader/writer function analog circuit 50.

The signal processing unit 44 modulates, D/A-converts, and up-converts data to be transmitted via the card function analog circuit 30 and the card reader/writer function analog circuit 50. The signal processing unit 44 also down-converts, A/D-converts, and demodulates the received data.

The DES engine 46 encrypts and decrypts data to be transmitted and data received via the card function analog circuit 30 and the card reader/writer function analog circuit 50 using a secret key encryption scheme based on a publicly recognized algorithm.

The CRC 47 performs a cyclic redundancy check on data received via the card function analog circuit 30 and the card reader/writer function analog circuit 50.

The UART 48 and the I²C interface serve as an external wired interface for connecting the IC card to an external apparatus, such as a cell phone, a PDA, or a personal computer (not shown in FIG. 11). The UART (universal asynchronous receiver transmitter) 48 converts parallel signals to a serial signal or converts a serial signal to parallel signals in a computer.

The RAM 41 is a writable memory unit. The CPU 41 executes a program using the RAM 41 as a work area. A memory space provided by the RAM 41 is addressable. The CPU 41 and each component on the internal bus can access the memory space.

The EEPROM 43 is a nonvolatile memory unit for which an erase operation can be performed and new data written. As used herein, the memory area in the IC card is basically referred to as a writable area in the EEPROM 43.

The memory area includes at least one file system. In an initial state, the memory area is managed by a single file system managed by the original IC card issuer. Subsequently, a service provider other than the IC card issuer separates the memory area to generate a new file system. The file separation from the memory space in the EEPROM 43 and an access operation after the file separation are described in detail below.

FIG. 4 is a schematic illustration of the structure of a control system of the memory area in the IC card according to the present invention. As shown in FIG. 4, this control system is basically implemented in the form of a subsystem of the operating system. The control system includes a protocol interface module, and an OS core module, and a file system.

The protocol interface module handles an access request to the file system from an external apparatus via the external peripheral interface, such as the UART 48, and an access request to the file system from the card reader/writer via the contactless IC card interface.

The OS core module encodes and decodes data exchanged with the file system, corrects the error of the data using the CRC, manages the number of data updates for each block of the EEPROM 43, checks a PIN, and performs mutual authentication.

Furthermore, the OS core module provides several application programming interfaces (APIs) for accessing the file system (e.g., APIs for PIN checking and mutual authentication during file access and APIs for file reading/writing).

A physical access is performed to the EEPROM 43 serving as a file system entity. The physical memory access operation to a memory device including an EEPROM is well known to those skilled in the art. Therefore, a description thereof is not provided here.

A memory area expanded on the EEPROM 43 includes at least one file system. In an initial state, the memory area is managed by a single file system managed by the original IC card issuer. When a service provider other than the original IC card issuer separates the memory area to create a new file system, the service provider is required for the privilege of separating the memory area and authentication by the original IC card issuer. After the memory space is separated, in order to access the file system, authentication of the file system by the service provider is required in place of authentication by the original IC card issuer. The separation of the file system is considered to be a virtual card issuing operation.

The OS manages a separating authority key $K_d$ for permitting the separation. Additionally, the OS manages an issuer key $K_I$ of the issuer (the original IC card issuer or the service provider which has separated the file), a system code, and an area ID for identifying a file area for each file system.

To access the file system, a procedure including a request for an area ID by polling and mutual authentication is required. The issuer of the file system (the card issuer for the original file or the service provider which uses the file system after being separated) poles the file systems using a system code that the issuer of the file system has in the form of an argument so as to acquire the area ID of a memory area corresponding to the file system. Subsequently, mutual authentication is performed using this area ID and an issuer key $K_I$. If the mutual authentication is successfully performed, the access to the file system is permitted. The access to the file system is performed through encrypted communication using the issuer key $K_I$ that is unique to the file system for the issuer. Accordingly, a different file system cannot read data from the file system without permission. In addition, an issuer other than the issuer of the file system cannot read data from and write data to the file system without permission.

FIG. 5 is a schematic illustration of the structure of a service providing system for managing electronic money, an electronic ticket, and other value information using a relatively high-capacity IC card.

As shown in FIG. 5, for example, a system 1 includes an issuer communications apparatus 11 used by an IC card issuer 21, a manager communications apparatus 12 used by a card storage area manager 22, a manufacturer communications apparatus 13 used by a manufacturer 23 of the apparatus, and a storage area separating apparatus 14 and a management file registration apparatus 15 used by a card storage area user 24.

In the system 1, when the IC card issuer 21 issues an IC card 16 to a card holder 26, file data related to a service provided by the card storage area user 24 is stored in the IC card 16 on the basis of a predetermined condition. Thus, the card holder 26 can receive the services from the IC card issuer 21 and the card storage area user 24 using the one IC card 16.

As shown in FIG. 1, in the system 1, the issuer communications apparatus 11, the manager communications apparatus 12, the manufacturer communications apparatus 13, the storage area separating apparatus 14, and the management file registration apparatus 15 are connected to each other via a network 17.

The IC card issuer 21 issues the IC card 16 to provide its own service using the IC card 16.

Upon receiving a request from the IC card issuer 21, the card storage area manager 22 performs a service to lend a storage area that is not used by the IC card issuer 21 in a storage unit (semiconductor memory) of the IC card 16 issued by the IC card issuer 21 to the card storage area user 24.

The manufacturer 23 manufactures the storage area separating apparatus 14 in response to a request from the card storage area manager 22 and delivers the storage area separating apparatus 14 to the card storage area user 24.

The card storage area user 24 requests the card storage area manager 22 to allow the card storage area user 24 to use a memory area of the IC card 16 and provides the service of the card storage area user 24. The card storage area user 24 corresponds to the above-described service provider which separates the memory area and creates a new file system. The card storage area user 24 provides its own service by using its own file system.

The card holder 26 receives the IC card 16 from the IC card issuer 21 so as to use a service provided by the IC card issuer 21. When the card holder 26 desires to receive the service provided by the card storage area user 24 after the IC card 16 is issued, the card holder 26 stores file data related to the service provided by the card storage area user 24 in the IC card 16 using the storage area separating apparatus 14 and the management file registration apparatus 15. Thereafter, the card holder 26 can begin using the service provided by the card storage area user 24.

To provide a service from the IC card issuer 21 and a service from the card storage area user 24 using one IC card 16, the system 1 has a configuration so that unauthorized person cannot read data from and cannot write data to the storage area storing file data related to the service provided by the IC card issuer 21 and the card storage area user 24.

As its name implies, the IC card 16 may be a card-type data communication apparatus. Alternatively, the IC card 16 may be realized as a cell phone (or a different mobile device) incorporating a semiconductor chip having the IC card function.

Although, the foregoing description is made with reference to one IC card issuer 21, one card storage area user 24, and one card holder 26 in FIG. 5, each one may be plural.

In this embodiment, file systems for a plurality of service providers are allocated in a single memory area of the IC card. Also, a single data communication apparatus is shared by the service providers so as to provide a plurality of services. This separate file system configuration can provide the management of a memory area available to a specific service provider that has a permission of an original card issuer and memory areas for a plurality of the service providers that have permission from the original card issuer as well as a memory area available to the original card issuer.

In particular, when a plurality of file systems each being available to a service provider are managed in addition to the file system available to the original card issuer, the border between the file systems functions as a firewall, thus appropriately preventing one of the file systems (i.e., one of the service providers) from being accessed (intruded) by the other file systems.

A method for managing the memory area of the IC card is now herein described with reference to FIGS. 6 to 9.

FIG. 6 illustrates the memory area in which an original card issuer manages only the original card issuer's file system. A system code SC1 is assigned to the original card issuer by a management mechanism of a system code. When an external apparatus or a program accesses the file system of the card issuer, the external apparatus or the program uses "SC1" as an identification code (i.e., an argument of a request command).

FIG. 7 is a diagram illustrating that the card issuer can permit another memory area manager to rent or buy a certain amount of free space in the file system of the card issuer. In this stage, the file system in the memory space has not been separated yet. As long as the card issuer has free space in the card issuer's file system, the card issuer can permit a plurality of area managers to rent or buy a certain amount of free space. For example, in an implementation in which a file system is identified by a 4-bit system code, the file system can be separated into a maximum of sixteen separate areas (the file system can be separated up to fifteen times).

FIG. 8 is a diagram in which another service provider separates a memory area permitted by the card issuer to generate a new file system. A system code SC2 is assigned to the new file system by the management mechanism of a system code. When an external apparatus or a program accesses the file system managed by the memory area manager (service provider), the external apparatus or the program uses "SC2" as an identification code (i.e., an argument of a request command).

FIG. 9 is a diagram in which a common area manager separates a memory area permitted by the card issuer using a system code SC0 of the common area. When an external apparatus or a program accesses the file system, which is a memory area managed by the common area manager, the external apparatus or the program uses the system code SC0 as an identification code (i.e., an argument of a request command).

To separate the initial memory area shown in FIG. 6 and generate a file system for another service provider, the service provider requests permission from the card issuer to use a memory area. Subsequently, in order to give the permission to use the memory area (i.e., permission to separate the file system), the card issuer acquires a "separate element package" that is required for separating the file system from a separating engineering manager. The card issuer further encrypts the data block including the received separate element package and the size (the number of blocks) of the separated area that the new service provider is permitted to use using an issuer key $K_I$ that exclusively belongs to the card issuer so as to generate a separate package. The card issuer then issues a separating request of the file system using the separate package.

The procedure of separating a memory area and generating a new file system is not a key feature of the present invention. As such, a detailed description thereof is not provided.

FIG. 10 is a schematic illustration of the structure of a memory area of the IC card in which a plurality of file systems coexist by repeating a separating operation.

As shown in the drawing, the system code SC and the area ID are set for each file system. In addition, mutual authentication can be carried out using the issuer key $K_I$ of a service provider (including the original card issuer) that uses the memory area. Thus, the service provider to which the file system is allocated can analyze, manage, and deal with the threat to security of the file system of the service provider independently from the original card issuer and the separating engineer.

Additionally, when the service provider accesses the file system of the service provider, the procedure including the request for the area ID and the mutual authentication is basically required. The service provider performs polling on file systems using the system code that the service provider has in the form of an argument so as to obtain an area ID of the memory area for the corresponding file system. Subsequently, mutual authentication is performed using this area ID and the issuer key KI. If the mutual authentication is successfully completed, the service provider is allowed to access the file system.

FIG. 11 is a schematic illustration of the structure of a request command exchanged between an external apparatus and the IC card. As shown in FIG. 11, each service provider (including the original card issuer) packages a request command (e.g., a read request, a write request, a data-delete request, or a area/service registration request, which is described below) using the issuer key $K_I$ that exclusively belongs to the file system of the service provider and carries out an encryption communication using this package. Accordingly, a different file system cannot retrieve unrelated data from the request command and a third party cannot read data from and write data to the file system without permission.

By repeating the separating operation of the memory area of the IC card, a plurality of file systems coexist, as shown in FIG. 10. A service provider that acquired the service provider's file system on the IC card under the permission of the original card issuer can arrange areas and services using the file system, as described below. Thus, the service provider can develop the business plan using the IC card as if the service provider was the card issuer.

The management in one file system is described below. Basically, the same operation is applied to each file system. It is assumed that, to operate the file system, the above-described area-ID request by polling and mutual authentication have been performed in advance.

In a file system, one or more applications, such as an external electronic value exchange including electronic payment, are allocated. A memory area allocated to an application is referred to as a "service memory area". Also, the use of the application, namely, the operation to access the service memory area corresponding to the application is referred to as a "service". Examples of the service include access for reading the memory, access for writing the memory, and the addition and subtraction of value information (e.g., electronic money).

In order to restrict the user of an application, namely, the activation of the service depending on whether the user has the access privilege, a security code is assigned to the application. The security code is verified at a service start-up time. Additionally, the access to the service memory area is secured with appropriate encrypted communication in accordance with the security level of the application.

In order to restrict the user of an application, namely, the activation of the service depending on whether the user has the access privilege, a security code (i.e., a PIN) is assigned to the application. The PIN is verified at a service start-up time. Additionally, the access to the service memory area is secured with appropriate encrypted communication in accordance with the security level of the application.

In this embodiment, a hierarchy structure that is similar to a "directory" is introduced to each file system set in a memory area of the IC card. Each application allocated in the memory area can be registered to an "area" in the desired layer. For example, a plurality of applications involved in a series of transactions or deeply related applications are registered to a service memory area in the same area (and the deeply related applications are further registered to the same parent area).

Thus, the applications in the memory area and the area are organized. For the user, the applications are efficiently classified and organized.

Additionally, a PIN can be set for each application in order to control the access privilege for the file system in a hierarchical fashion. Furthermore, a PIN can be set for each area. For example, by inputting a PIN for some area, a user may obtain the access privilege for all the applications in the area after the verification process and a mutual authentication process are successfully carried out. Accordingly, for example, since, by inputting a PIN for some area only once, the user can obtain the access privilege for all the applications involved in a series of transactions, an efficient access control can be provided. In addition, the ease of operation of the apparatus can be improved.

Furthermore, a plurality of access privileges can be set for a service memory area, and a security code can be set for each privilege, namely, for each service executed in the service memory area. For example, different PINs are set for services activated in the same service memory area (e.g., "read" service and "read and write" service). In another example, different PINs are set for "increase" service and "decrease" service of electronic money or other value information. Furthermore, for some memory area, the following setting is possible: the input of a PIN is not required for a read operation; however, the input of a PIN is required for a write operation.

FIG. 12 is a schematic illustration of the data structure of the file system. In an example shown in FIG. 12, a hierarchy structure that is similar to a "directory" is introduced to a memory space of the file system. That is, each application allocated to the memory area can be registered to a desired hierarchy area as a service memory area. For example, deeply related applications (e.g., applications used for a series of transactions) can be registered to the same area (and the deeply related areas can be further registered to the same parent area).

In addition, each of the application (i.e., the service memory area) and the area allocated to the file system has a security code definition block. Therefore, a PIN can be set for each application or each area. Furthermore, the access privilege for the file system can be set on an application basis and on an area basis.

Still furthermore, instead of setting one privilege for a service memory area, a PIN can be set for each executed service. For example, different PINs are set for services "read" and "read and write" that are activated for the same service memory area. Also, different PINs are set for services "increase" and "decrease" of electronic money or other value information.

A verification unit compares a PIN sent via the protocol interface (such as the contactless short-range communication based on electromagnetic induction or the UART 48, or I²C 49) with a security code set for an area allocated to each application or a directory or with a security code set for a service memory area, so that the access to the memory area having the equal security code is allowed. The memory area to which access is allowed is accessible via the protocol interface.

As described above, in a file system, a variety of service memory areas that are allocated to applications are allocated, and one or more services that are applicable to each service memory area are set. In this embodiment, access restriction is set on an area basis and on an application basis. In addition, a PIN is set for the type of services applied to an application so that access restriction can be set on a service basis.

FIG. 13 illustrates the basic structure of the file system. As described in relation to FIG. 12, the hierarchy structure that is similar to a "directory" is introduced to each file system. A service memory area allocated to an application can be registered to an area in the desired layer. In the example shown in FIG. 13, one service memory area is registered in an area 0000 defined by an area definition block 0000.

The service memory area in FIG. 13 is composed of at least one user block. The term "user block" refers to a minimum unit of data to which an access operation is ensured. A service defined by a service 0100 definition block, namely, a service 0108 can be applied to the service memory area.

In addition to access restriction on an area basis and on an application basis, an access restriction can be set on a service basis by setting a security code for each type of service. Security code setting information for the service to which the access restriction is applied is defined as a service dedicated to the security code (i.e., a security code service). In the example shown in FIG. 13, a security code for the service 0108 is defined as a security code service 0128 definition block. The details of the security code service are stored in a security code service data block.

When the security code service for the service 0108 is enabled, the security code is required to be verified using the security code service 0128 before the service 0108 is activated and the read or write operation is performed on the user block of the service 0108. More specifically, when a read/write command with encryption is used, the security code for the service 0108, namely, the PIN for the service 0108 is verified before the mutual authentication is performed.

In addition, a service memory area allocated to an application can be registered in an area in the desired layer, and the area can be layered (the deeply related areas are registered in the same parent area). In such a case, by setting a PIN for each area, the area can serve as a unit of the access restriction. FIG. 14 illustrates areas layered in memory space of the IC card 50. In the example shown in FIG. 14, a different area 1000 defined by an area 1000 definition block is registered in an area 0000 defined by an area 0000 definition block.

In the example shown in FIG. 14, two service memory areas are further registered in the area 1000. To one of the two service memory areas, a service 1108 defined by a service 1108 definition block and a service 110B defined by a service 110B definition block can be applied. As used herein, to define a plurality of different services for one service memory area is referred to as an "overlap service". In the overlap service, different services are applied to the same service area depending on the input PIN. Additionally, to the other one of the two service memory areas, a service 110C defined by a service 110C definition block can be applied.

After a service set in a service memory area is activated, a read or write operation can be carried out on the user block of the service memory area. As described in relation to FIG. 13, a security code service can be defined for each service. In this case, if the security code service for the service is activated, the activation of the service is allowed after PIN verification using the security code service is completed.

When a common PIN is required to be set for a plurality of services, an area including these services can be generated and a common security code service can be applied to this area.

In the example shown in FIG. 14, a security code for the area 1000 is defined as a security code service 1020 definition block. The details of the security code service are stored in a security code service data block.

When the security code service for the area 1000 is enabled (as will be described further below), the security code is verified using the security code service 1020. Thereafter, each service in the area 1000 is activated. Thus, a read or write operation can be performed on the user block of the service.

Here, when a security code service is applied to the service in the area 1000 and the security code service is enabled, the read or write operation cannot be performed on the user block of the service until the security code verification using the security code service is completed.

As shown in FIGS. 13 and 14, a unique security code service corresponding to the area and service for the security code verification is provided.

The procedure of registering an area and a service in a file system is not directly related to a key feature of the present invention. As such, a detailed description thereof is not provided.

As shown in FIGS. 13 and 14, by applying a PIN to the area or the service registered in the file system, an access control can be carried out on an area basis or on a service basis. Additionally, when a plurality of services (an overlap service) is registered in one service memory area, a plurality of access methods can be defined for the same service memory area by applying a PIN to each service.

However, in this embodiment, when accessing the file access, the mutual authentication (as described above) using the issuer key is essential and the PIN verification process is optional. That is, only when the security code service for a service or an area is enabled, the security code verification is required before starting the service or accessing the area. In contrast, when the security code service is disabled, the PIN verification is not required.

The details of the PIN are written in the security code service data block of the security code service definition block. FIG. 15 is a schematic illustration of the data structure of the security code service data block. As shown in FIG. 15, the security code service data block includes a security code area, a storage area for the number of failed authentication attempts, a setting area of maximum allowed failed authentication attempts, a security code use selection area, and an access permission flag.

Only when the PIN entered by the user is successfully verified, the access permission flag in the security code service data block for the corresponding service or area is set so that access to the service or area is allowed.

The access permission flag is a flag indicating whether access to the corresponding application or directory is allowed or not. The service or area whose access permission flag is set is accessible. By default, the access permission flag of the service or area for which a PIN is required is set to "inaccessible". After the PIN verification operation and the mutual authentication operation using the issuer key of the file system are successfully carried out, the access permission flag is set so that access is allowed. In addition, if the access permission flag is continuously set and the IC card is lost or stolen, the user could suffer monetary loss due to unauthorized use of the service or area. Therefore, the IC card may have a feature to automatically change from the accessible state to the inaccessible state in response to, for example, the absence of electromagnetic waves.

In addition, when an invalid PIN is input, the number of failed authentication attempts is updated. If the number of failed authentication attempts exceeds the maximum allowed failed authentication attempts set in the setting area of maximum allowed failed authentication attempts, the start of the corresponding service or access to the corresponding area is inhibited.

In general, once the input of the PIN is successful, the number of failed authentication attempts should be cleared.

Thus, a malicious user is prevented from combing the security code. If the number of inputs of the PIN from the user accidentally exceeds the maximum allowed failed authentication attempts and the verification fails, only a manager of the IC card (e.g., the separating engineering manager or the original card issuer) may clear the number of failed authentication attempts. To authenticate the manager, authentication using a private key, which is described below, may be employed, for example.

FIG. 16 illustrates the procedure for controlling the start of a service or access to an area in accordance with the security code input from the user in the form of a flow chart.

When a user inputs a security code (step S11), the security code service data block of the security code service definition block is accessed to verify the security code (step S12).

If the PIN in the security code service data block is equal to the PIN input by the user, the access permission flag in the security code service data block is set so that the corresponding service or area becomes accessible (step S13).

For example, by placing an IC chip above a reader/writer, a PIN input via a user interface of an external apparatus (not shown) connected to the reader/writer can be transmitted to the IC card using a contactless short-range communication interface based on electromagnetic induction.

As shown in FIG. 16, when the access privilege to the application and the directory is controlled using the PIN, a malicious user could break the security wall by combing the PIN (in particular, in the case where a short-digit number is used for the security code). Accordingly, in this embodiment, the maximum allowed failed authentication attempts is set in the security code definition area so that an application or directory whose number of failed authentication attempts exceeds the maximum allowed failed authentication attempts becomes inaccessible. Thus, the access control is provided.

FIG. 17 illustrates a procedure for controlling the access privilege to a service and an area using the number of failed authentication attempts in the form of a flow chart.

When a user inputs a PIN (step S21), each security code service definition block is accessed to verify the PIN (step S22).

If the PIN input by the user is equal to the PIN in the security code service definition block, the access permission flag in the security code service data block is set so that the corresponding service or area becomes accessible (step S23).

However, if the PIN input by the user is not equal to the PIN in all of the security code service definition blocks, the number of failed authentication attempts in the security code definition area is updated (step S24). Additionally, if the PIN input by the user is equal to the PIN in all of the security code service definition blocks and the authentication is successful, the number of failed authentication attempts is cleared to zero.

At step S25, it is determined whether the updated number of failed authentication attempts exceeds the maximum allowed failed authentication attempts set in the security code definition area (step S25).

If the number of failed authentication attempts exceeds the maximum allowed failed authentication attempts, the access permission flag in the security code definition area is cleared. Thus, the corresponding service or area becomes inaccessible (step S26). As a result, a malicious user is prevented from combing the PIN.

In contrast, if the number of inputs of the PIN from the user accidentally exceeds the maximum allowed failed authentication attempts and the verification of the security code fails, only a manager of the IC card (e.g., the separating engineering manager or the original card issuer) may clear the number of failed authentication attempts. To authenticate the manager, authentication using a private key may be employed, for example.

As noted above, in this embodiment, a session between the data communication apparatus and an external apparatus is managed for each file system so that a threat to security is independently analyzed, managed, and dealt with for each file system.

For example, when an access to a file system via a contactless short-range communication interface based on electromagnetic induction or via a wired interface (e.g., the UART 48 or the I$^2$C 49) is requested, mutual authentication using the issuer key KI and the PIN verification of the file system are performed. If these procedures are successfully completed, the file system is unlocked so that a permitted access operation (e.g., a read/write operation) can be performed. The above-described mutual authentication using the issuer key KI is essential whereas the PIN verification is optional. Only when the PIN verification is enabled, is the matching process performed. Additionally, even when the mutual authentication and PIN verification are successfully completed and the file system is unlocked, further PIN verification is sequentially required if individual PIN verification is set for individual areas and services.

For a system in which a memory area of an IC card is separated into a plurality of file systems for the service providers and is shared by the service providers, when access to a given file system is attempted and mutual authentication and PIN verification are carried out and when the system enters a release state and the session is established, the security of the other file systems becomes a concern. This is because, if the state of the session is maintained, the threat of the security of the other file systems being cracked arises during the session.

Accordingly, in this embodiment, by using the function of separating the memory area into a plurality of file systems together with the security code verification function of the directory and file in each file system, the threat to the security of each file system can be independently analyzed, managed, and dealt with.

That is, when a plurality of logical file systems are disposed in the memory area of the IC card (see, for example, FIG. 10) and an external apparatus or a program changes the file system to be accessed, the system management information (including the mutual authentication information) and PIN release information held in each memory area are reset. Furthermore, by resetting the power supply of the IC card after a certain period of time has elapsed since the IC card was powered on (e.g., a period of time in which the used session encryption scheme cannot be decrypted on the basis of present-day cracking technology and the speed of present-day computers), similarly, system management information and PIN release information are reset.

FIG. 18 illustrates the state transition of the system management information and PIN release information managed by the operating system of the IC card (see FIG. 4).

When the system is powered on or the OS is booted, an authentication-required state starts in which the mutual authentication and the PIN verification are required when accessing the file system. However, the mutual authentication process using the issuer key (as described above) is essential, whereas the PIN verification process is optional. Only when the PIN verification is enabled, is the PIN verification process required.

Here, the mutual authentication process is carried out between the external apparatus (or a program) and the data communication apparatus using a contactless short-range communication interface based on electromagnetic induction or using a wired interface, such as the UART 48 or I²C 49. Furthermore, the PIN verification process is carried out. If these processes are successfully completed, the system is unlocked, and therefore, a permitted access operation (e.g., a read/write operation) can be enabled.

In the release state, by resetting power to the IC card after a certain period of time has elapsed since the IC card was powered on (e.g., a period of time in which the used session encryption scheme cannot be decrypted on the basis of present-day cracking technology and the speed of present-day computers), the IC card is returned to the authentication-required state.

Additionally, when a file system is unlocked and the file system is switched to another file system, the IC card is returned to the authentication-required state. When the file system is switched, a polling procedure is required to acquire the area ID of the file system. Thus, the operating system can identify the state change. The operating system carries out the mutual authentication before returning the area ID (as stated above).

Thus, by appropriately switching between the authentication-required state and release state, the system can eliminate the threat of cracking caused by continuously maintaining the session state.

The collaboration of system management and the PIN function management in the memory area of the IC card is described next with reference to FIGS. 19 to 21. Here, in the drawings, the memory area is separated into three file systems.

FIG. 19 illustrates the initial state of the memory area (i.e., the state immediately after resetting). Each of the file systems can hold a system code serving as an identifier used for the external apparatus or the program to access the file system, the system management information (including authentication information), and PIN release information.

FIG. 20 illustrates the state of the memory when the external apparatus or the program accesses a file system #1 using the identifier SC1. The external apparatus or the program can receive an area ID as a return value. When the file system #1 becomes active, system management information #1 and PIN release information #1 serving as security information are stored in the memory area.

FIG. 21 illustrates the state of the memory immediately after the external apparatus or the program has accessed a file system #2 using a system code SC2 in the state shown in FIG. 20. In such a case, the switching of the file system occurs.

The switching of an active file system is carried out as a function of the highest priority among all the logical functions. At the same time as the file system #2 is activated, the system management information #1 and the PIN release information #1 held in the memory area are cleared. Instead, the system management information #2 and the PIN release information #2 are held in the memory.

Thus, by using the function of separating the physical memory area into a plurality of file systems together with the PIN function of the directory and file in each file system, the file systems can be independently and securely managed and dealt with.

INDUSTRIAL APPLICABILITY

Although the invention has been shown and described in detail with reference to the specific embodiments, it would be apparent to those skilled in the art that alternative embodiments may be made without departing from the spirit and scope of the invention as defined in the appended claims.

While an embodiment of the present invention has been described with reference to an information management method of a memory area incorporated in an IC card, the present invention is not limited thereto. The present invention is applicable to a method of managing the security of a single memory device incorporated in an apparatus other than an IC card in the same manner.

That is, the forgoing description of the preferred embodiments of the invention has been presented only for the purpose of illustration and description and is not intended to be exhaustive or to limit the invention to the precise forms disclosed. Therefore, the scope of the invention should be determined by the appended claims.

Figure 1:
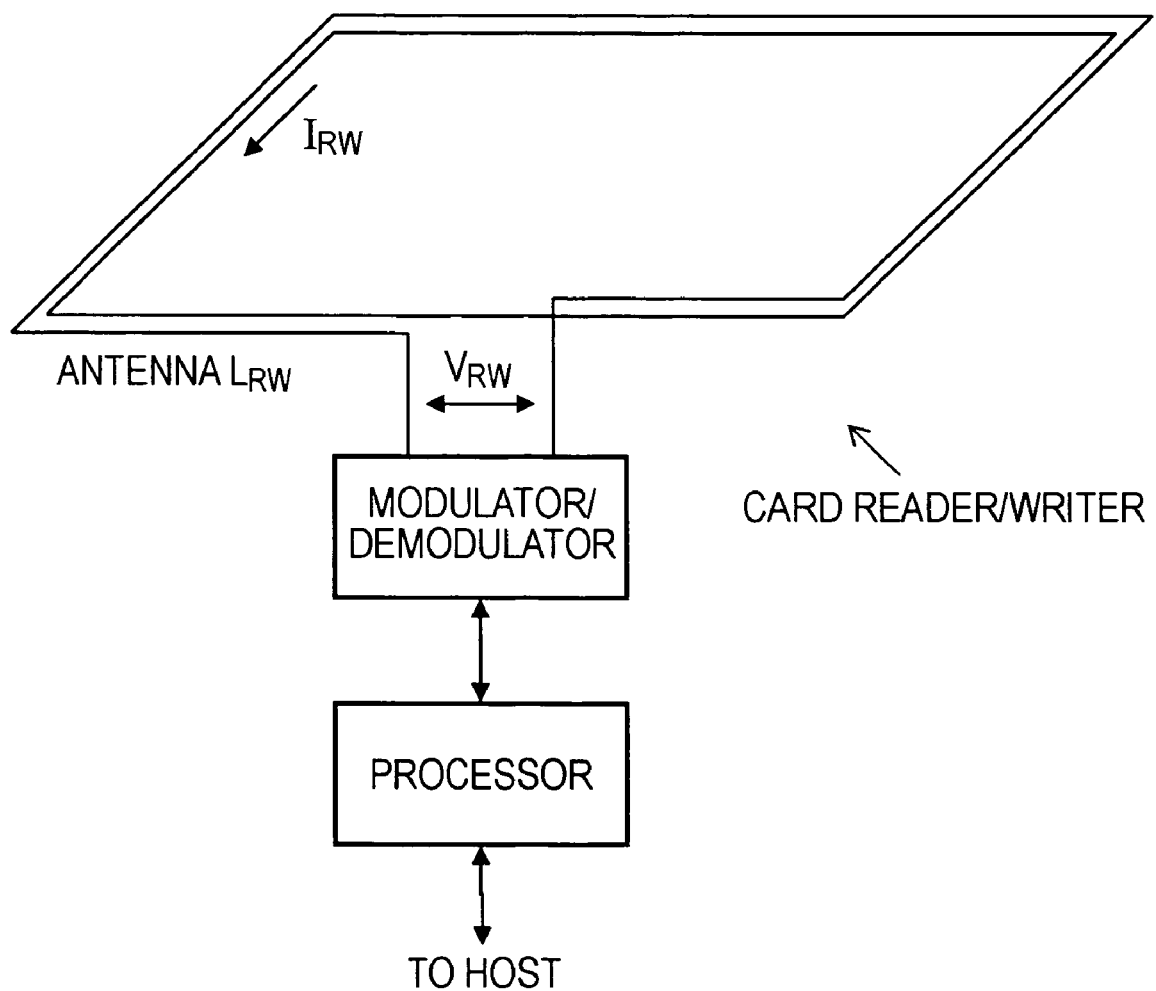
FIG. 1 is a schematic illustration of the basic concepts of wireless data communication between a card reader/writer and an IC card based on electromagnetic induction.
Figure 2:
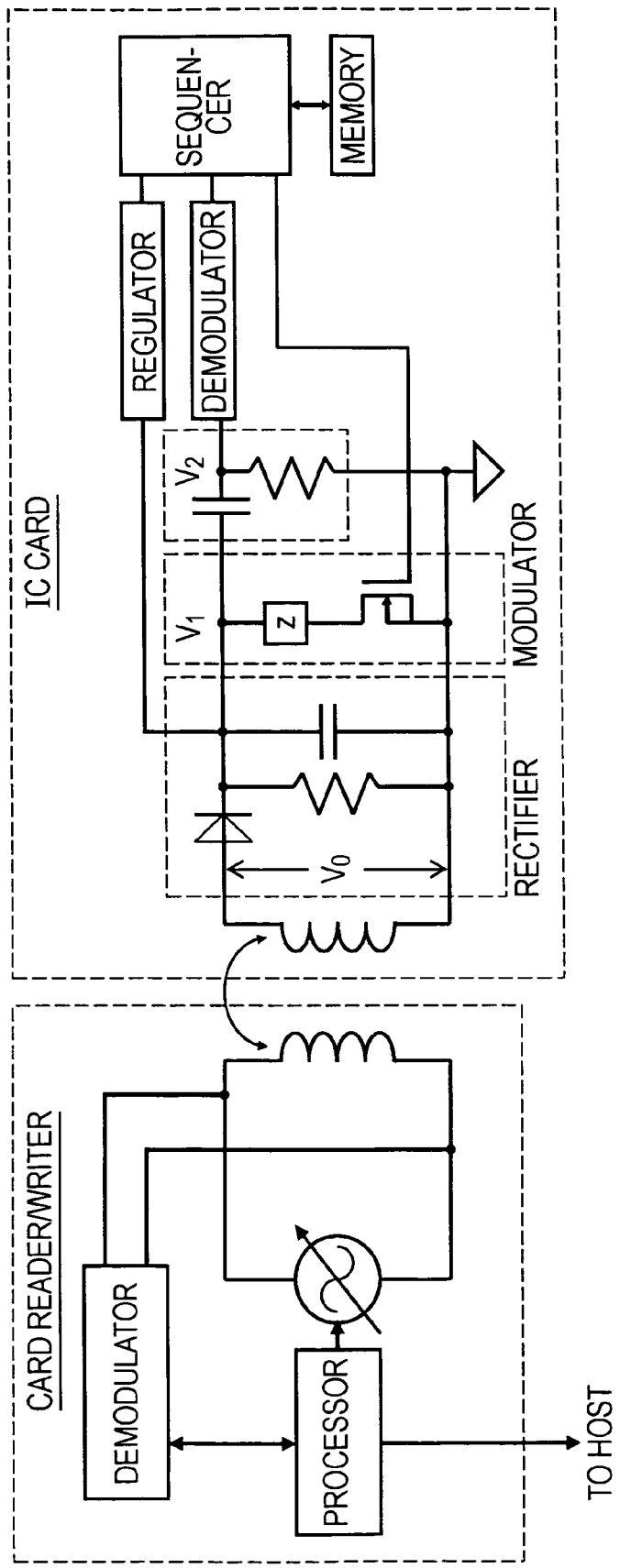
FIG. 2 is a diagram in which a system including the card reader/writer and the IC card is modeled as a transformer.
Figure 3:
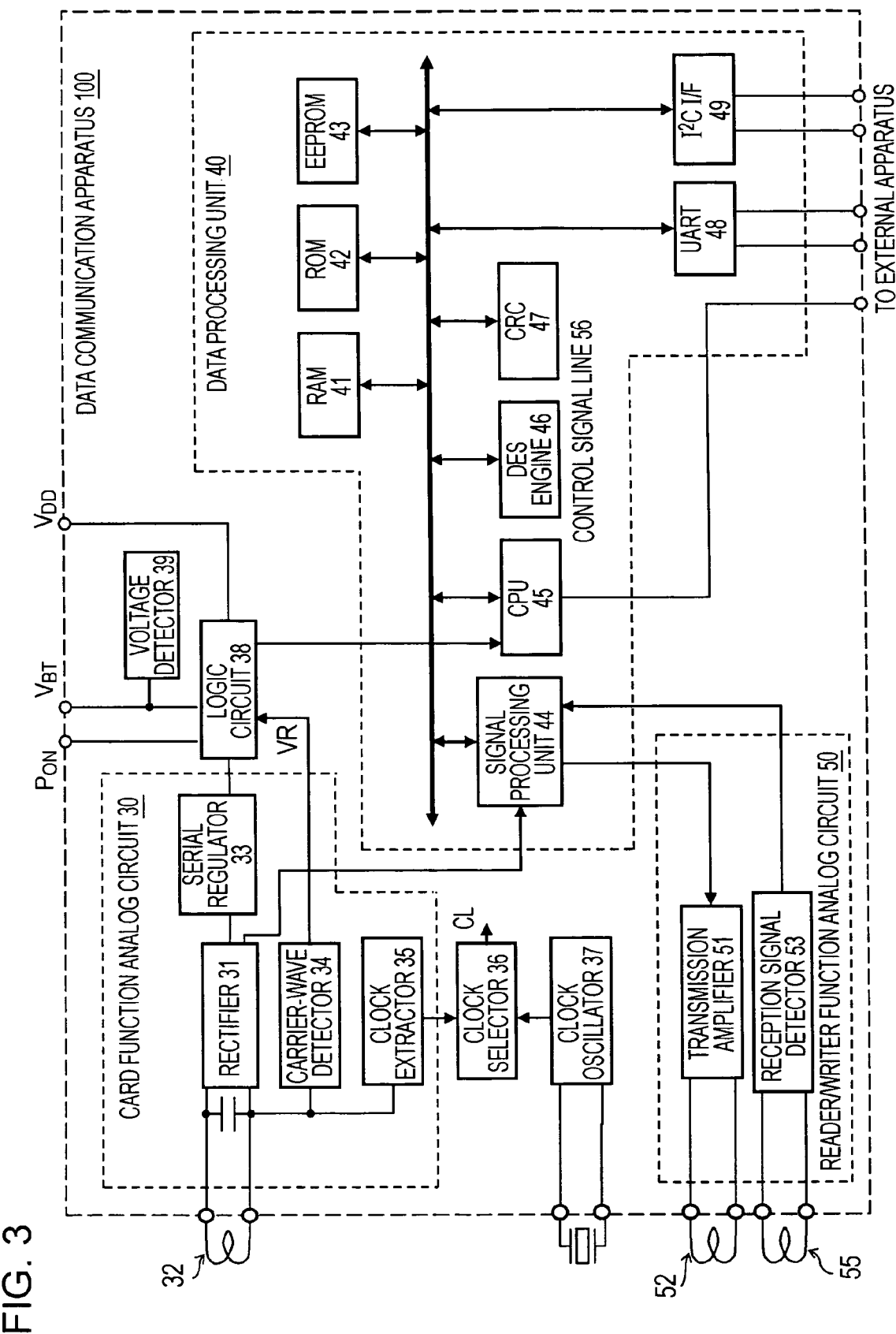
FIG. 3 illustrates the hardware configuration of a data communication apparatus according to an embodiment of the present invention.
Figure 4:
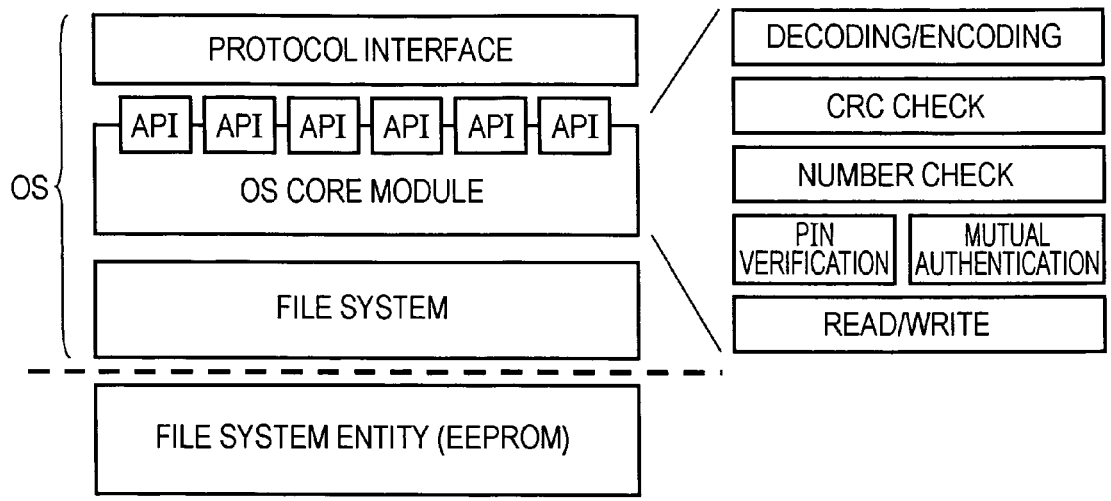
FIG. 4 is a schematic illustration of the structure of a control system of a memory area in the IC card according to an embodiment of the present invention.
Figure 5:
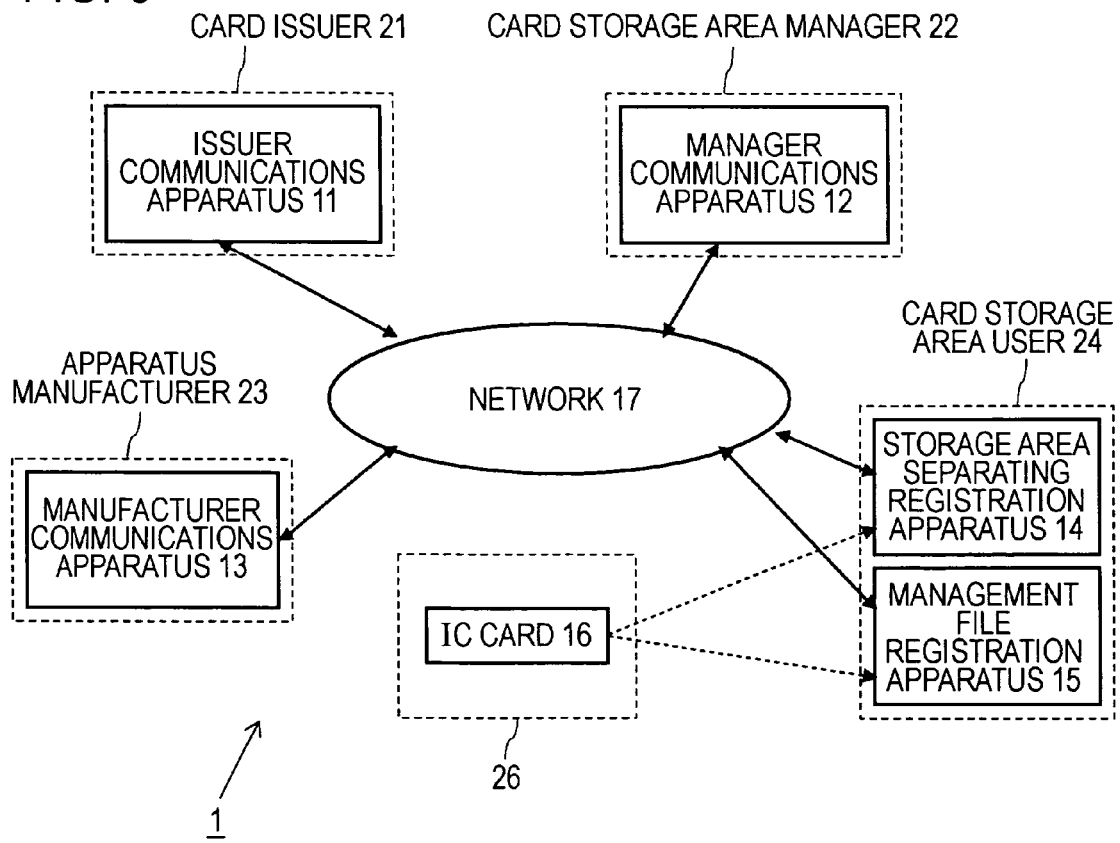
FIG. 5 is a schematic illustration of the structure of a service providing system using the IC card.
Figure 6:
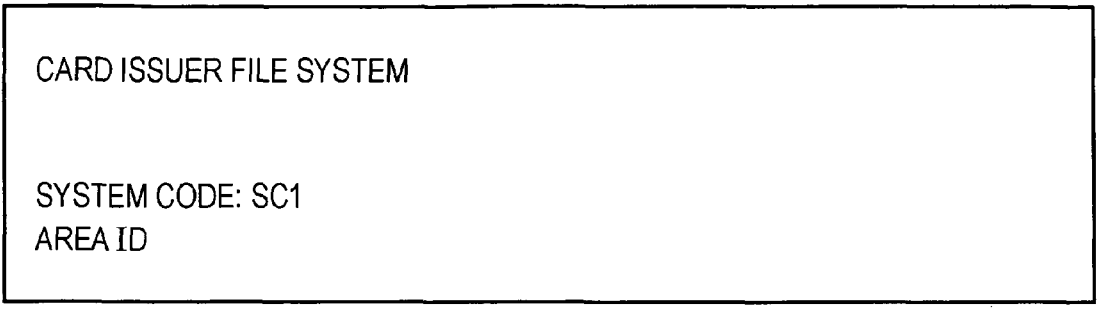
FIG. 6 illustrates a memory area in which an original card issuer manages only the file system of the original card issuer.
Figure 7:
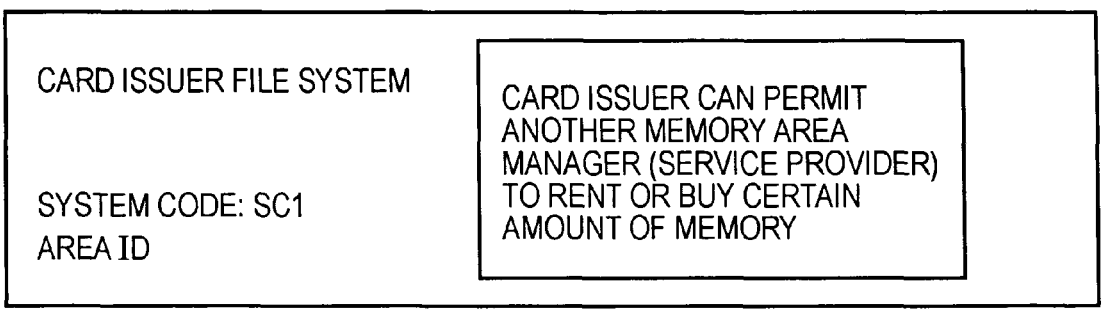
FIG. 7 is a diagram illustrating that the card issuer can permit an area manager to rent or buy a certain amount of free space of the file system of the card issuer.
Figure 8:
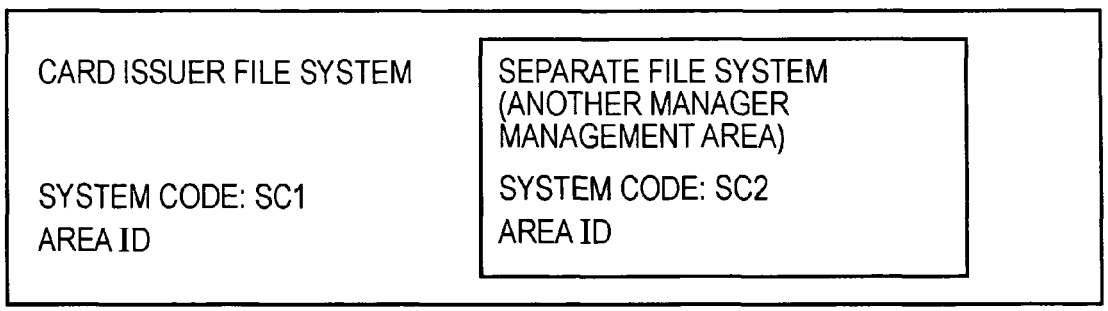
FIG. 8 is a diagram in which another service provider separates a memory area permitted by the card issuer to generate a new file system.
Figure 9:
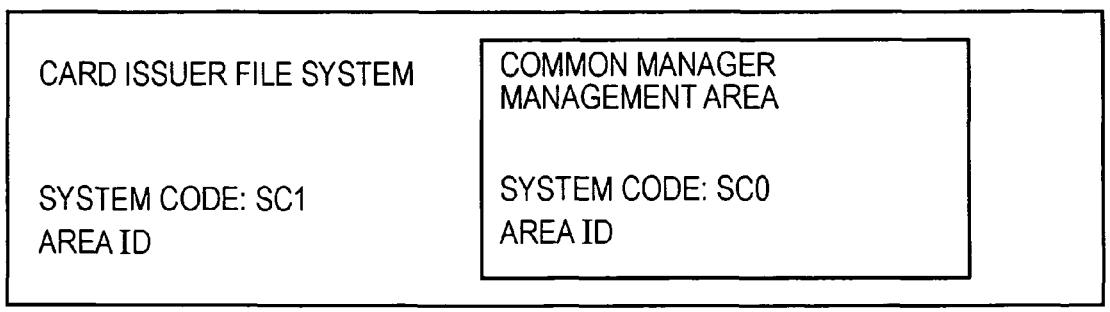
FIG. 9 is a diagram in which a common area manager separates a memory area permitted by the card issuer using a system code SC0 of the common area.
Figure 10:
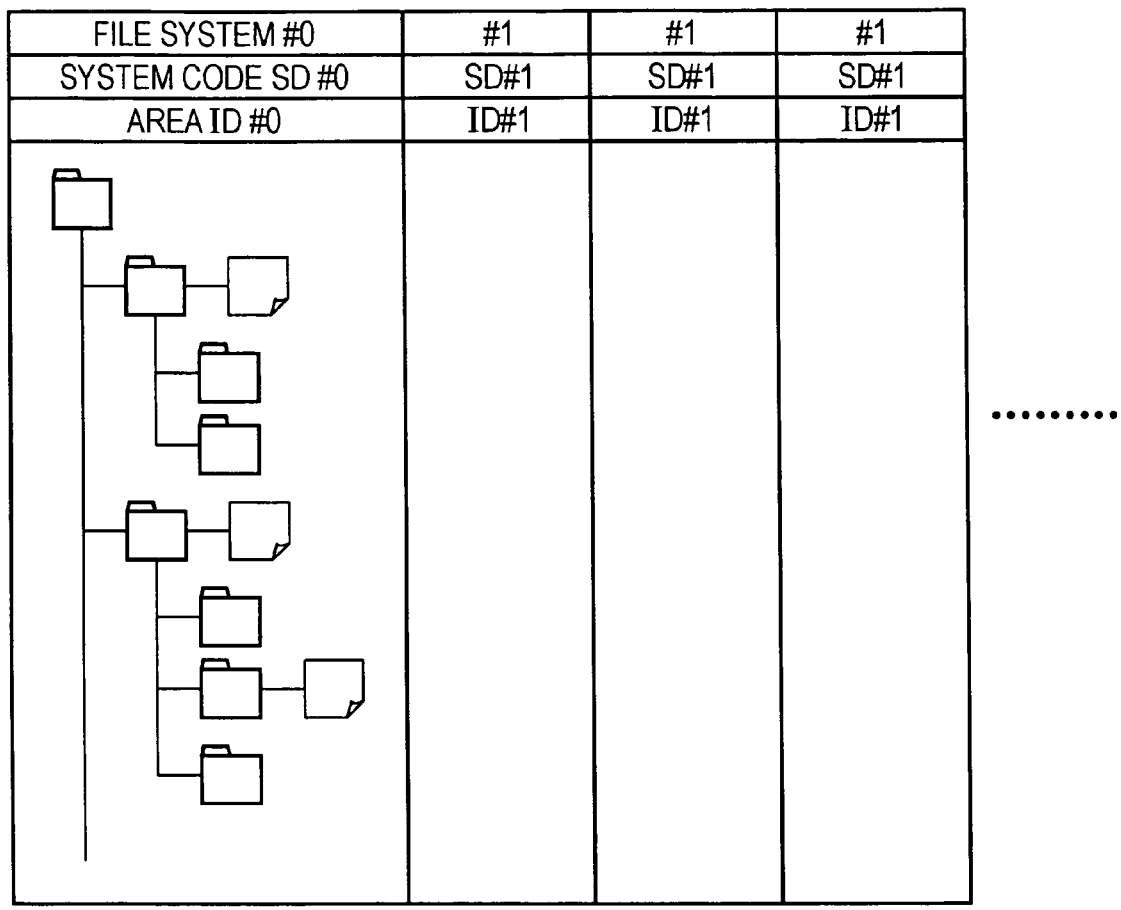
FIG. 10 is a schematic illustration of the structure of a memory area of the IC card in which a plurality of file systems coexist by repeating a separating operation.
Figure 11:
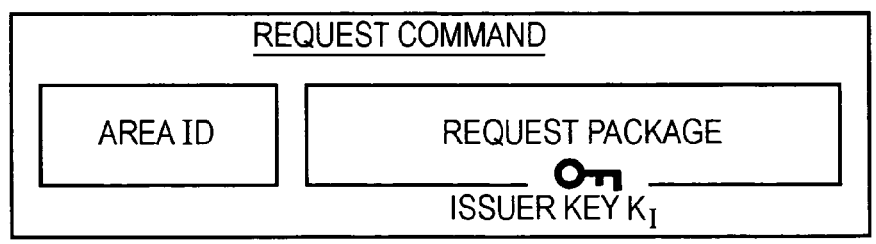
FIG. 11 is a schematic illustration of the structure of a request command exchanged between an external apparatus and the IC card.
Figure 12:
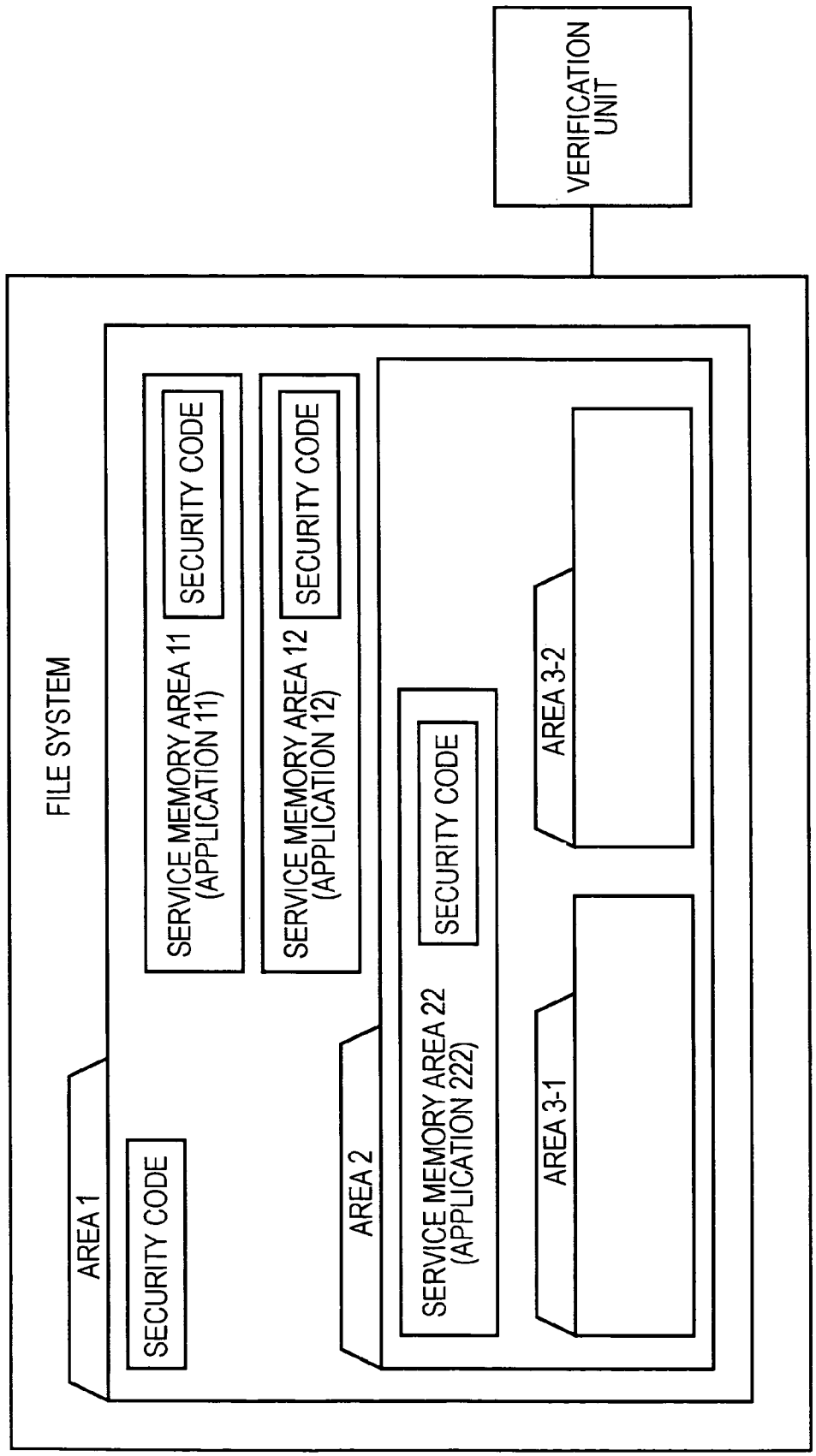
FIG. 12 is a schematic illustration of a directory structure in the file system.
Figure 13:
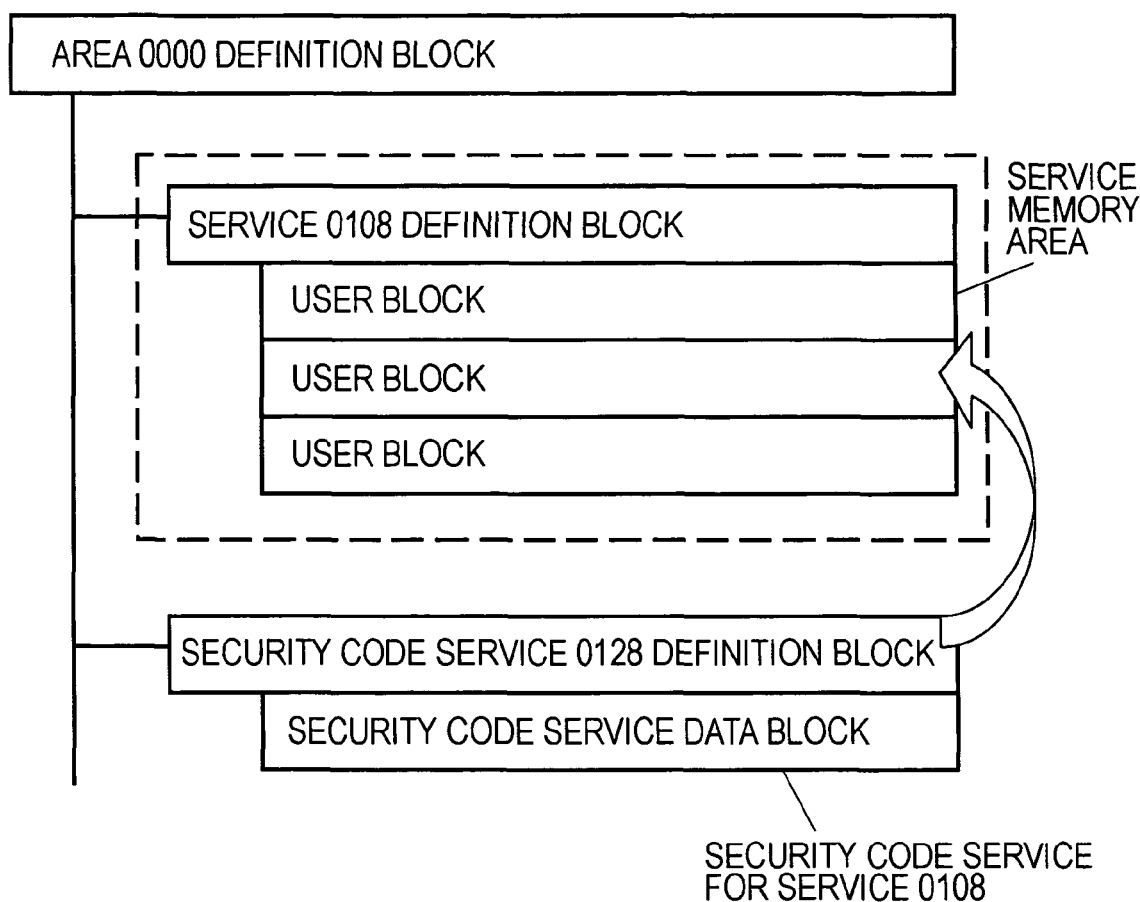
FIG. 13 illustrates the basic structure of the file system.
Figure 14:
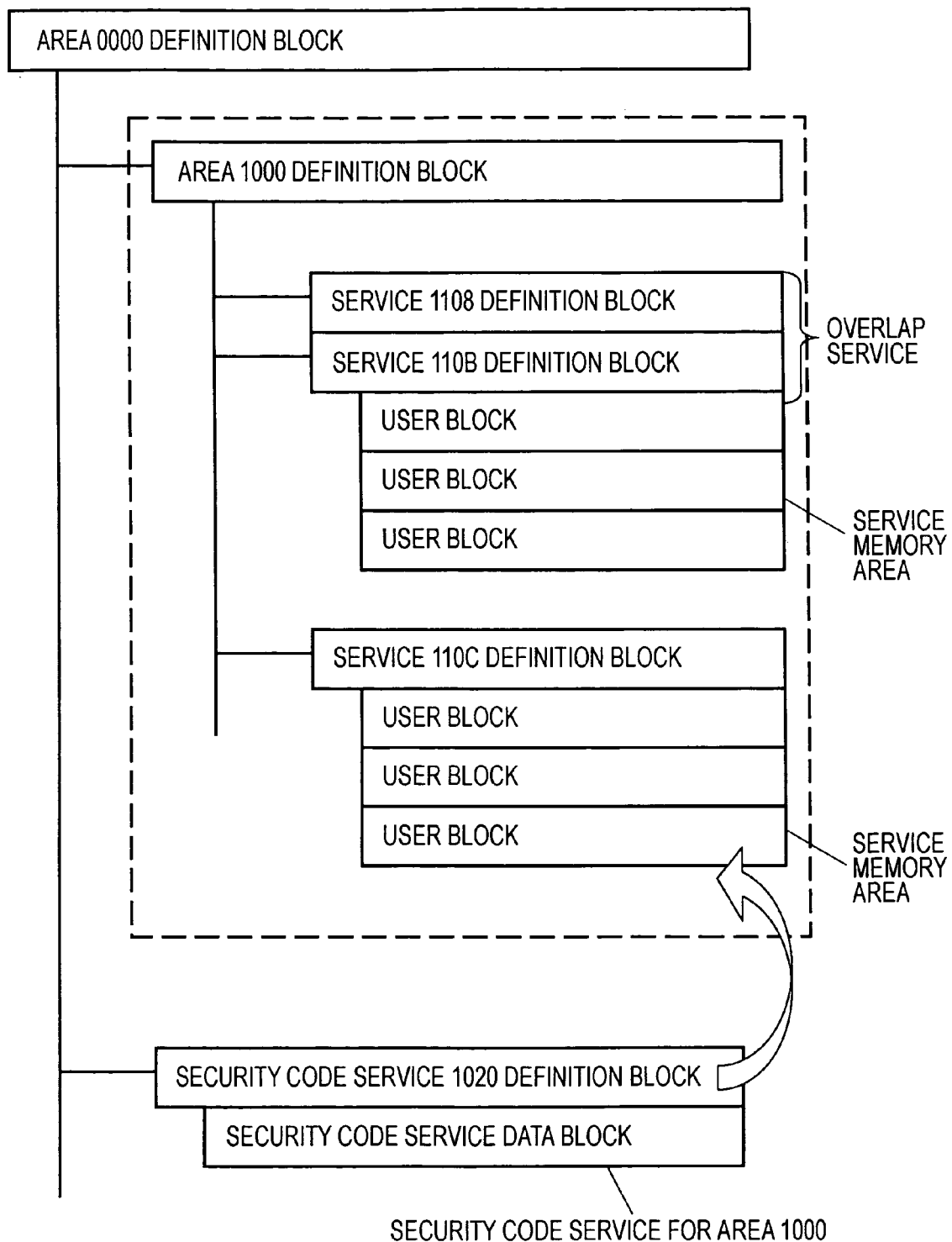
FIG. 14 illustrates areas layered in a memory space of an IC card 50.
Figure 15:
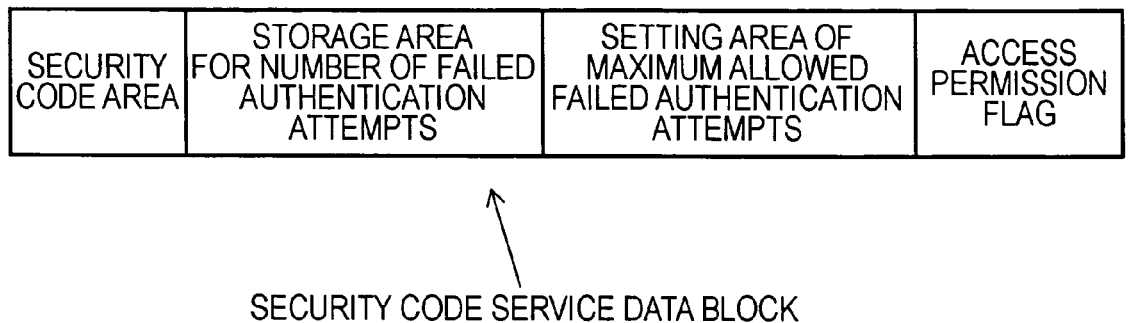
FIG. 15 is a schematic illustration of the data structure of a security code service data block.
Figure 16:
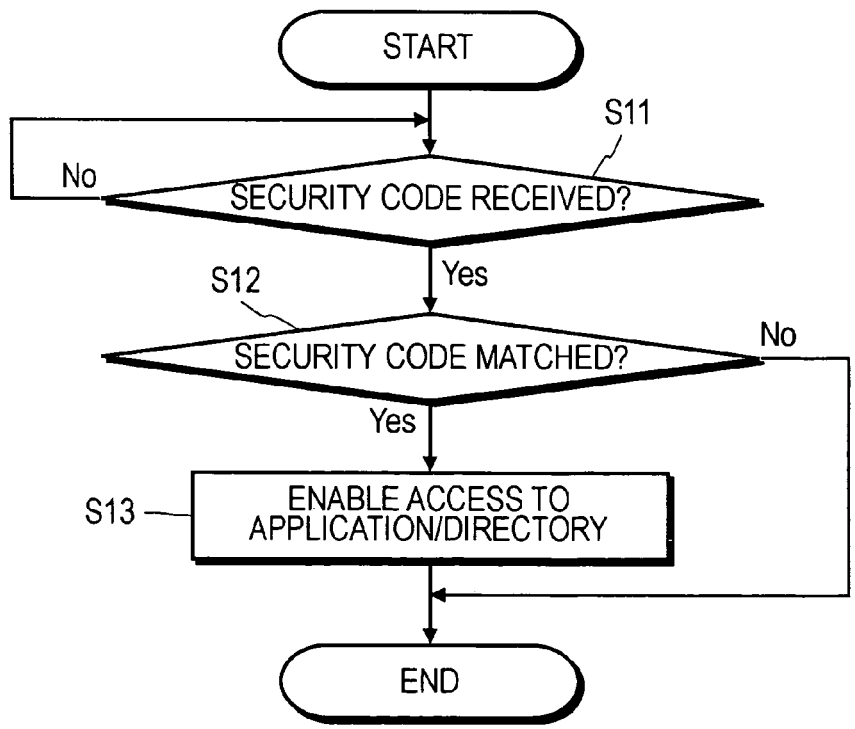
FIG. 16 is a flow chart illustrating the procedure for controlling the activation of a service or the access privilege to an area in accordance with a security code input from a user.
Figure 17:
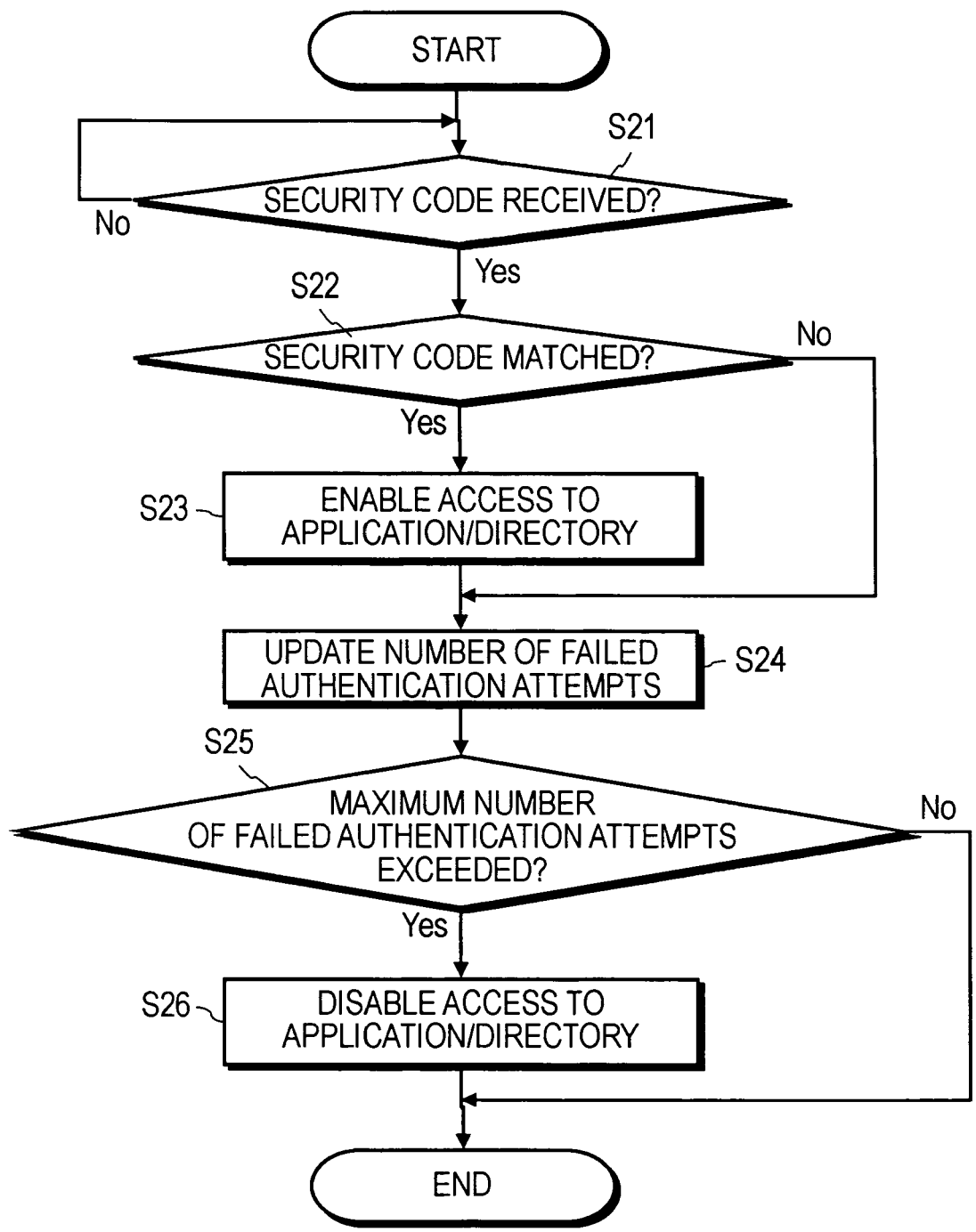
FIG. 17 is a flow chart illustrating the procedure for controlling the access privilege to a service and an area on the basis of the number of failed PIN input attempts.
Figure 18:
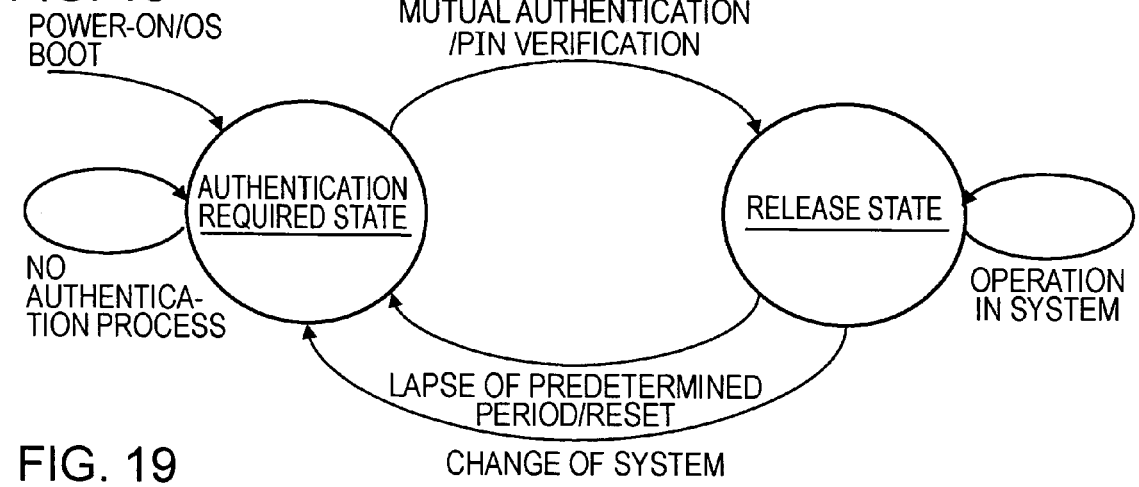
FIG. 18 illustrates state transition of mutual authentication information and PIN verification information managed by an operating system of the IC card (see FIG. 4)
Figure 19:
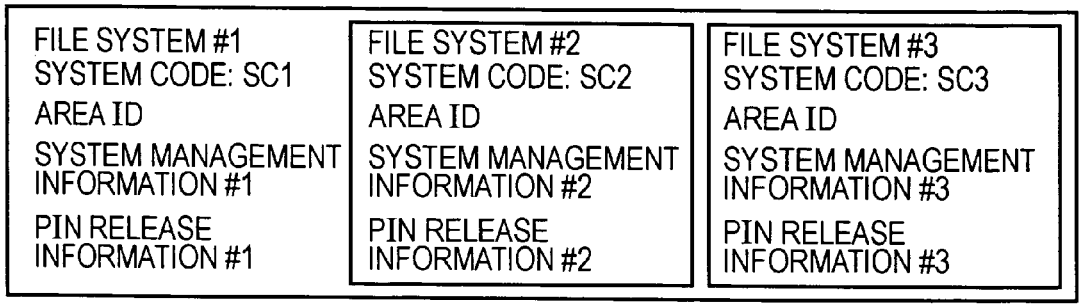
FIG. 19 illustrates the initial state of a memory area separated into a plurality of file systems.
Figure 20:
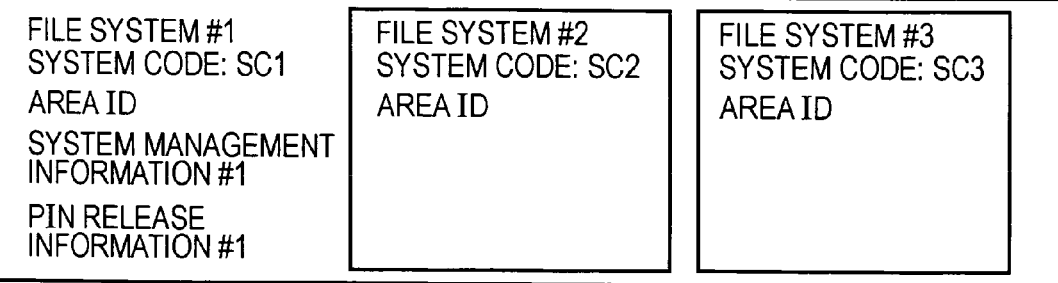
FIG. 20 illustrates the state of the memory when an external apparatus or a program accesses a file system #1 using an identifier SC1.
Figure 21:
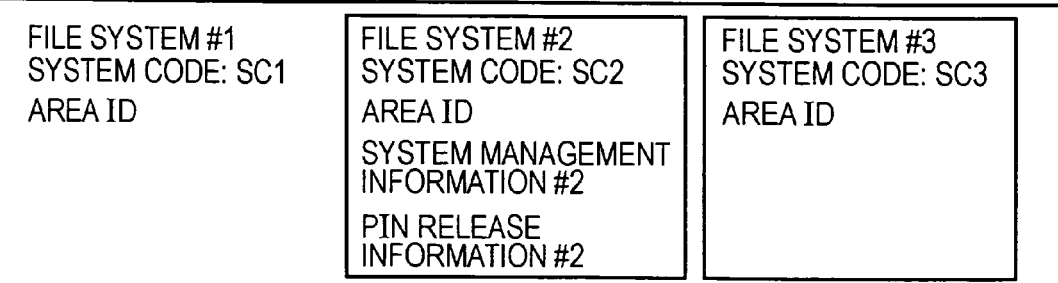
FIG. 21 illustrates the state of the memory immediately after the external apparatus or the program has accessed a file system #2 using a system code SC2 in the state shown in FIG. 20.

REFERENCE NUMERALS 11 issuer communications apparatus
12 manager communications apparatus
13 manufacturer communications apparatus
14 storage area separating apparatus
15 management file registration apparatus
16 IC card
17 network
21 card issuer
22 card storage area manager
23 manufacturer of apparatus
24 card storage area user
26 card holder
30 card function analog circuit
31 rectifier
32 antenna
33 serial regulator
34 carrier-wave detector
35 clock extractor
36 clock selector
37 clock oscillator
38 logic circuit
39 voltage detector
40 data processing unit
41 RAM
42 ROM
43 EEPROM
44 signal processing unit
45 CPU
46 data encryption engine
47 error correction unit
48 UART interface
49 I²C interface
50 reader/writer function analog circuit
51 transmission amplifier
52 transmission antenna
53 reception signal detector
51 reception amplifier filter
55 reception antenna
100 data communication apparatus

The invention claimed is:

1. A data communication apparatus having a memory space, the data communication apparatus managing the memory space by separating the memory space into one or more file systems, the apparatus comprising:
   authenticating means for requesting performance of a mutual authentication for each file system to be accessed from an external apparatus or a program, the mutual authentication including a key associated with a service provider of the external apparatus or the program designated at a time of creation of the file system wherein the key is not provided as an input from a user;
   authentication information managing means for managing, for each file system, whether the file system is in an authentication-required state in which performance of the mutual authentication is requested or in a release state in which the access is permitted after the mutual authentication is completed; and
   state managing means for returning the file system from the release state to the authentication-required state in response to an occurrence of a predetermined event.

2. The data communication apparatus according to claim 1, wherein, when one of the external apparatus and the program changes the accessing file system to another file system, the state managing means resets the release state of the original accessing file system to the authentication-required state.

3. The data communication apparatus according to claim 1, wherein the state managing means resets the file system from the release state to the authentication-required state after a predetermined period of time has elapsed since the file system was changed to the release state or after a predetermined period of time has elapsed since the data communication apparatus was powered on.

4. The data communication apparatus according to claim 1, wherein the authenticating means verifies a security code.

5. The data communication apparatus according to claim 4, wherein the security code includes a Personal Identification Number (PIN).

6. The data communication apparatus according to claim 4, wherein the authentication information means further comprises determining whether the file system is in an authentication-required state in which performance of the verification of the security code is requested or in a release state in which the access is permitted after the verification of the security code is completed.

7. A method for managing a memory of a data communication apparatus, the data communication apparatus having a memory space and managing the memory space by separating the memory space into one or more file systems, the method comprising the steps of:
   (a) requesting performance of a mutual authentication for each file system to be accessed from an external apparatus or a program, the mutual authentication including a key associated with a service provider of the external apparatus or program designated at a time of creation of the file system wherein the key is not provided as input from a user;
   (b) managing, for each file system, whether the file system is in an authentication-required state in which performance of the mutual authentication is requested or in a release state in which the access is permitted after the mutual authentication is completed; and
   (c) returning the file system from the release state to the authentication-required state in response to an occurrence of a predetermined event.

8. The method for managing a memory of a data communication apparatus according to claim 7, wherein, when one of the external apparatus and the program changes the accessing file system to another file system, step (c) resets the file system from the release state to the authentication-required state.

9. The method for managing a memory of a data communication apparatus according to claim 7, wherein step (c) resets the file system from the release state to the authentication-required state after a predetermined period of time has elapsed since the file system was changed to the release state or after a predetermined period of time has elapsed since the data communication apparatus was powered on.

10. The method for managing a memory of a data communication apparatus according to claim 4, wherein step (a) further comprises requesting performance of a verification for a security code for each file system to be accessed from an external apparatus or a program.

11. The method for managing a memory of a data communication apparatus according to claim 10, wherein step (b) further comprises managing, for each file system, whether the file system is in an authentication-required state in which performance of the verification of the security code is requested or in a release state in which the access is permitted after the verification for the security code.

12. The method for managing a memory of a data communication apparatus according to claim 10, wherein the security code includes a Personal Identification Number (PIN).

13. A data communication apparatus having a memory space, the data communication apparatus managing the memory space by separating the memory space into one or more file systems, the apparatus comprising:
- a first file system associated with a first key designated by a supplier of the data communication apparatus; and
- a second file system associated with a second key designated by a service provider that has been granted permission by the supplier to use an area of the memory space identified by an area id,
- wherein following a mutual authentication including the area id and the second key access to the second file system is granted.

14. The data communication apparatus of claim 13, wherein the first and second keys are encrypted.

15. The data communication apparatus of claim 13, wherein access to the second file system is provided by encrypted communications encrypted by the second key.

16. The data communication apparatus of claim 13, wherein the first file system further comprises a plurality of application areas and access to at least one of the application areas is allowed only after a verification of a security code.

17. The data communication apparatus of claim 13, wherein the second file system further comprises a plurality of application areas and access to at least one of the application areas is allowed only after a verification of a security code.

* * * * *